US011725737B2

(12) United States Patent
Karl et al.

(10) Patent No.: US 11,725,737 B2
(45) Date of Patent: Aug. 15, 2023

(54) FLUID CIRCULATION VALVE AND THERMAL TREATMENT SYSTEM FOR A VEHICLE COMPRISING SUCH A VALVE

(71) Applicant: Valeo Systemes Thermiques, Le Mesnil Saint-Denis (FR)

(72) Inventors: Stefan Karl, Le Mesnil Saint-Denis (FR); Mohamed Yahia, Le Mesnil Saint-Denis (FR); Jin-Ming Liu, Le Mesnil Saint-Denis (FR); Bertrand Nicolas, Le Mesnil Saint-Denis (FR); Roland Akiki, Le Mesnil Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 83 days.

(21) Appl. No.: 17/421,542

(22) PCT Filed: Jan. 7, 2020

(86) PCT No.: PCT/FR2020/050015
§ 371 (c)(1),
(2) Date: Jul. 8, 2021

(87) PCT Pub. No.: WO2020/144427
PCT Pub. Date: Jul. 16, 2020

(65) Prior Publication Data
US 2022/0065352 A1    Mar. 3, 2022

(30) Foreign Application Priority Data

Jan. 8, 2019  (FR) ...................................... 1900161

(51) Int. Cl.
*F16K 1/12* (2006.01)
*B60H 1/00* (2006.01)
(Continued)

(52) U.S. Cl.
CPC ......... *F16K 1/123* (2013.01); *B60H 1/00485* (2013.01); *F16K 27/029* (2013.01);
(Continued)

(58) Field of Classification Search
CPC ................. F16K 31/0651; F16K 1/123; F16K 31/0668; F16K 47/04; F16K 47/08;
(Continued)

(56) References Cited

U.S. PATENT DOCUMENTS

| 43,949 | A | * | 8/1864 | Miller | F16K 47/08 |
| | | | | | 137/625.37 |
| 486,722 | A | * | 11/1892 | Loss | F16K 47/08 |
| | | | | | 137/625.33 |
| 3,971,415 | A | * | 7/1976 | Foller | F16K 47/08 |
| | | | | | 137/630.19 |
| 4,193,421 | A | * | 3/1980 | Sakakibara | F16K 31/0682 |
| | | | | | 251/303 |

(Continued)

FOREIGN PATENT DOCUMENTS

EP          1316750 A1    6/2003

OTHER PUBLICATIONS

International Search Report with Written Opinion in corresponding International Application No. PCT/FR2020/050015, dated Apr. 24, 2020 (11 pages).

*Primary Examiner* — Umashankar Venkatesan
(74) *Attorney, Agent, or Firm* — Osha Bergman Watanabe & Burton LLP (57) ABSTRACT

Fluid circulation valve, the said valve comprising a housing (1) and a body (2) for circulation of fluid, the said body (2) being located at least partially within the said housing (1), the said body (2) being attached to the housing (1) and having a passage (4) for fluid between the said body (2) and the said housing (1), the said valve further comprising a control member (30) that can be actuated electromagneti-
(Continued)

cally, the said control member (30) being able to move with respect to the said body (2) so as to selectively open or close the said passage (4), the said body (2) having at least locally a tubular configuration at the said passage (4), the said control member (30) being able to slide along the said body (2) at least at the said passage (4).

9 Claims, 5 Drawing Sheets (51) Int. Cl.
*F16K 27/02* (2006.01)
*F16K 27/04* (2006.01)
*F16K 31/06* (2006.01)

(52) U.S. Cl.
CPC ........ *F16K 27/0272* (2013.01); *F16K 27/048* (2013.01); *F16K 31/0668* (2013.01)

(58) Field of Classification Search
CPC ............... F16K 27/0272; F16K 27/029; F16K 27/048; B60H 1/00485
See application file for complete search history.

(56) References Cited

U.S. PATENT DOCUMENTS

| | | | | |
|---|---|---|---|---|
| 4,216,938 A * | 8/1980 | Inada | ..................... | F02M 69/32 123/585 |
| 4,240,468 A * | 12/1980 | Brand | ................. | F16K 31/0655 137/625.33 |
| 4,286,767 A * | 9/1981 | Hashimoto | ........... | F16K 31/082 251/65 |
| 4,294,286 A * | 10/1981 | Ohumi | .................. | F16K 31/082 137/625.48 |
| 4,307,752 A * | 12/1981 | Inada | .................... | F16K 31/082 137/625.48 |
| 4,346,736 A * | 8/1982 | Inada | .................... | F16K 31/082 137/625.48 |
| 4,350,319 A | 9/1982 | Kawata et al. | | |
| 4,368,759 A * | 1/1983 | Akagi | ...................... | F16K 3/24 137/625.48 |
| 4,501,298 A * | 2/1985 | Inada | .................... | F16K 31/082 137/625.48 |
| 4,530,374 A * | 7/1985 | Akagi | ................... | F16K 31/082 137/625.48 |
| 4,535,815 A * | 8/1985 | Ohumi | .................. | F16K 31/082 137/625.48 |
| 6,783,110 B2 * | 8/2004 | Hirota | ..................... | F16K 1/123 251/129.08 |

* cited by examiner

FLUID CIRCULATION VALVE AND THERMAL TREATMENT SYSTEM FOR A VEHICLE COMPRISING SUCH A VALVE

The invention relates to a fluid circulation valve and a thermal treatment system for a vehicle, in particular a motor vehicle, comprising such a valve.

Global warming and the depletion of fossil energy sources are currently driving motor vehicle manufacturers to invest in the development of vehicles that are less polluting and that consume less conventional fuel. Thus, in recent years new vehicles have emerged that at least partially operate using electrical in energy.

These vehicles, whether they are fully electric or even hybrid vehicles, that is, combining the use of a combustion engine and an electric motor, therefore require a substantial supply of electrical energy and are equipped with energy storage devices, generally including several battery modules.

These battery modules struggle to operate outside a determined temperature range. In order to optimize the operation and service life of said battery modules, they should thus be kept at a temperature below 45° C. for example. To this end, it is known practice to use a refrigerant circuit, additionally used to heat or cool different zones or different components of the vehicle.

One of the operating phases of the battery modules during which they must be cooled is their charging phase. A new charging technique has recently been developed. It consists of charging the electrical storage device at a high voltage and current, so as to charge the electrical storage device in a time of at most a few tens of minutes. This rapid charging involves the heating of the electrical storage device, which requires higher rating of the heat exchanger(s) used for the thermal regulation of the electrical storage device. However, although the cooling requirement of the electrical storage device is very considerable during the rapid charging phases, this requirement decreases during driving phases or so-called "conventional" charging phases. The use of a highly rated heat exchanger is then unnecessarily energy-consuming, generates weight and/or requires space. In addition, if the cooling requirement of the storage device is low and at the same time the cooling requirement of the passenger compartment of the vehicle is high, it can be difficult to control the cooling power of said electrical storage device.

A solution is proposed in a patent application by the applicant, unpublished on the filing date of the present application, that makes it possible to modulate the cooling of the electrical storage device as a function of its requirements while complying with a temperature difference imposed by the temperature of a forced air flow in the passenger compartment. It is therefore a question of modulating a cooling power within a fixed temperature difference.

To this end, the refrigerant circuit used for cooling the battery modules comprises at least one compression device, a first heat exchanger suitable for being passed through by a flow of air external to a passenger compartment of the vehicle, an expansion member and a plurality of heat exchangers suitable for cooling the battery modules. Furthermore, said heat exchangers are capable of being supplied with refrigerant independently of each other, by means of dedicated valves.

Said circuit thus comprises a great number of valves and there is a need for a valve with a limited cost while being suited to the specific conditions of such use, in particular the high pressure of the refrigerant. There is thus a need for a valve capable of remaining sealed to the outside. The applicant has also shown that, in such a use, the pressure difference of the fluid upstream and downstream of the valve is relatively small, of the order of a few hundred millibars. The constraints linked to the degree of sealing that the valves must offer in order to prevent the fluid from flowing downstream of the circuit, in the closed position of the valve, are therefore limited.

The invention aims to take advantage of this finding and to this end proposes a fluid circulation valve, said valve comprising a housing and a body for the circulation of the fluid, said body being situated at least partially in said housing, said body being fastened to the housing and having a passage for fluid between said body and said housing, said valve further comprising a control member that can be actuated electromagnetically, said control member being able to move relative to said body in order to selectively open or close said passage, said body having, at least locally, a tubular configuration in line with said passage, said control member being capable of sliding along said body at least in line with said passage.

Although the sliding movement envisaged for opening or closing the valve is not the movement best suited to ensuring a tight seal against the flow of the fluid in the circuit in the closed position of the valve, as seen above, at least in the application in question, this is not significant. At the same time, such a movement has a number of advantages. Firstly, it limits the force to be applied to the control member in order to move it from its closed position to its open position. The control member can be immersed in the fluid while ensuring in that the pressures that are applied on either side of the control member are balanced, at least partially. The forces to be overcome in order to move it are therefore limited. Furthermore, the proposed configuration makes it possible not to use valves the closed position of which is determined by the control member thereof resting on a seat. This thus avoids the associated drawbacks such as the wear of the seat and the noise generated by the impact of the control member against the seat.

Moreover, the use of a control member that can be actuated electromagnetically makes it possible to move it remotely from the outside of the housing and thus promotes the sealing of the valve to the outside compared with valves comprising a shaft that must emerge through the housing in order to drive the member controlling the opening/closing of the circulation of the fluid. It can also be noted that the implementation of a sliding movement of the control member and the electromagnetic nature of its actuation promotes the production of a valve with a simple configuration.

However, the control member can be actuated by sliding, as explained above, by any other means, in particular pneumatic, without departing from the scope of the invention.

According to various features of the invention which can be considered together or separately, in any technically possible combination:

said control member is situated between the housing and said body, said housing is made in one piece, said valve is provided with a first inlet/outlet, in particular an inlet, for fluid, said valve is provided with a second inlet/outlet, in particular an outlet, for fluid, said body emerges from said housing in a so-called through portion, said through portion is provided with said first fluid inlet/outlet, said control member comprises a sleeve, said sleeve is cylindrical,
said body comprises a liner, provided with said passage,
said sleeve and said liner are coaxial,
the sleeve surrounds the liner,
there is play between the sleeve and the housing,
said housing and said body are coaxial,
said control member comprises a magnetic material,
said valve comprises a winding for exciting the control member,
the excitation winding surrounds the outside of said housing,
the housing and the excitation winding are coaxial,
said valve further comprises a return spring making it possible to return said control member to the rest position,
said rest position is an open position of the passage,
said rest position is a closed position of the passage,
said control member and said return spring continue axially from each other,
said valve comprises a spring for stabilizing the control member,
said control member and said stabilizing spring continue axially from each other,
said return spring and said stabilizing spring are situated on either side of the control member,
said passage is situated on a side wall of the body,
said passage comprises one or more orifices,
said orifices are diametrically opposed,
said liner is closed at one of its longitudinal ends, known as blind, situated in said housing,
said passage is situated near said blind end,
the opposite end of the liner defines said first inlet/outlet of the valve,
said valve comprises an inlet/outlet pipe, particularly an outlet pipe, for the fluid, inserted into said housing,
said pipe is situated at a distance from said body,
said pipe continues axially from said body,
the diameter of the pipe is equal to the diameter of the body,
the axis of the body forms an angle of between 130° and 180° with the axis of the pipe,
said valve comprises a one-piece assembly defining said liner and said pipe,
said one-piece assembly is formed by a tube,
said tube comprises an internal partition, making it possible to separate an internal volume of the liner and an internal volume of the pipe,
said pipe comprises one or more orifices for the circulation of the fluid emerging into said housing,
said control member and/or said body is/are provided with a plurality of openings for the circulation of the fluid allowing the progressive opening of the passage when said control member is moved,
said passage openings are calibrated to allow the expansion of the fluid,
said valve comprises one or more sealing rings between said body and said control member,
said housing, said body and/or said pipe are made from a thermoplastic material,
said valve comprises a bonded connection fastening said housing, said body and/or said pipe to each other.

The invention also relates to a thermal treatment system for a vehicle, in particular a motor vehicle, comprising at least one valve as described above.

Other objects, features and advantages of the invention will become more clearly apparent from the following description, given with reference to the appended figures, in which:

FIG. 6 shows the valve in FIG. 5, this time in a closed configuration, FIG. 7 schematically illustrates, in longitudinal section, a fourth exemplary embodiment of a valve according to the invention, in an additional configuration, FIG. 8 schematically illustrates, in longitudinal section, a fifth exemplary embodiment of a valve according to the invention, in an additional configuration, FIG. 9 schematically illustrates an example of a thermal treatment system according to the invention.

Figure 1:
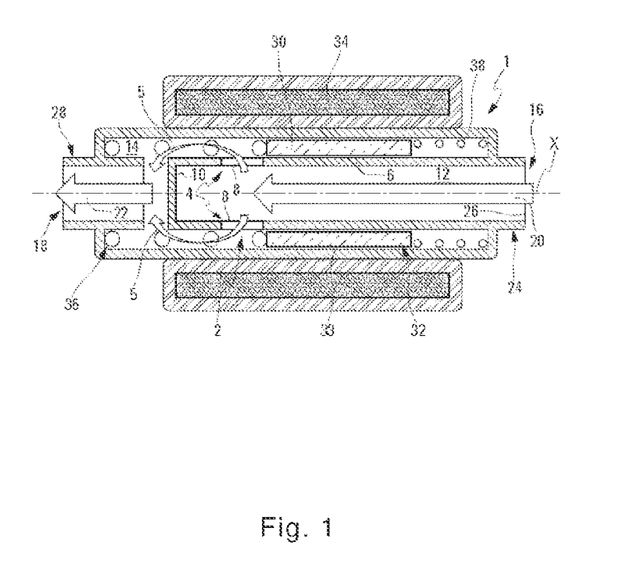
FIG. 1 schematically illustrates, in longitudinal section, a first exemplary embodiment of a valve according to the invention, in an open configuration.
Figure 2:
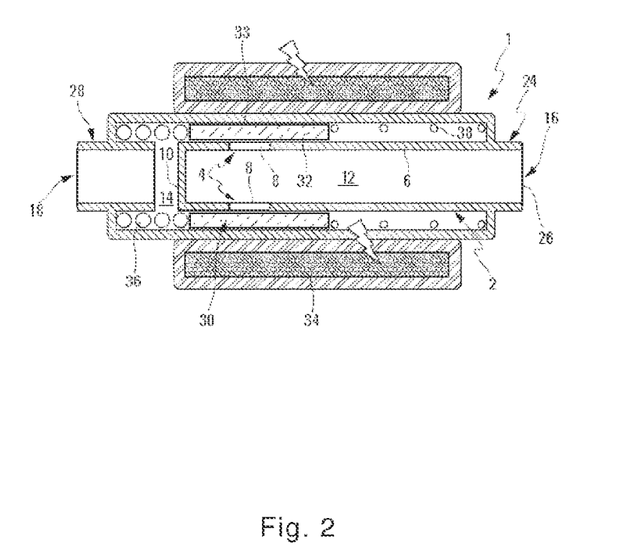
FIG. 2 shows the valve in FIG. 1, this time in a closed configuration, FIG. 3 schematically illustrates, in longitudinal section, a second exemplary embodiment of a valve according to the invention, in a closed configuration.

As illustrated in FIGS. 1 and 2, the invention relates to a fluid circulation valve. Said fluid is, for example, a refrigerant.

Said valve comprises a housing 1 and a body 2 for the circulation of the fluid. Said body 2 is at least partially situated in said housing 1. Said body 2 has a passage 4 for fluid between said body 2 and said housing 1, along the arrows labeled 5 (FIG. 1). Said body 2 is fastened to the housing 1.

Said body 2 has, at least locally, a tubular configuration in line with said passage. Here, said body 2 extends along a longitudinal axis X and has a tubular configuration along its entire length. Said body 2 advantageously has a shape with symmetry of revolution about said longitudinal axis X. Said body 2 is formed, for example, by a liner 6.

Said passage 4 is situated on a side wall of the body 2, in particular a side wall of said liner 6. Said passage 4 comprises one or more orifices 8, in particular orifices 8 with the same cross-section and diametrically opposed. Said orifices 8 are for example two in number. They can have a circular cross-section or any other shaped cross-section.

Here, said liner 6 is closed at one 10 of its longitudinal ends, known as blind, situated in said housing 1. Said passage 4, in particular said orifices 8, are situated near said blind end 10.

Said housing 1 advantageously has a shape with symmetry of revolution, in particular about the longitudinal axis X. In other words, said housing 1 and said body 2 are preferably coaxial.

Taken in combination, said housing 1 and said body 2 form at least two fluid circulation chambers, namely a first chamber 12 situated inside the body 2 and a second chamber 14, situated between the body 2 and said housing 1, Furthermore, the first chamber 12 and the second chamber 14 are in communication with each other by means of the fluid passage 4. Said passage 4 emerges radially into said first chamber 12 and into said second chamber 14.

Said valve is provided with an inlet 16 and an outlet 18 for fluid. The fluid thus enters the valve along the arrow labeled 20, passes through the passage 4 and leaves the valve along the arrow labeled 22, in the open position of the valve (FIG. 1).

Here, said body 2 emerges from said housing 1 in a so-called through portion 24. Said through portion 24 is advantageously provided with said fluid inlet 16. More specifically, the longitudinal end 26 of the liner 6, opposite its blind end 10, defines the inlet 16 of the valve. In other words, the liner 6 is open at its longitudinal end 26 situated in the through portion 24.

Said valve comprises a pipe 28 for the outlet of the fluid. Said pipe 28 is inserted into said housing 1 in a fixed manner. Said pipe 28 is situated at a distance from said body 1 so that said pipe 28 emerges at one of its longitudinal ends into the housing 1, at the second chamber 14, and to the outside at the opposite longitudinal end, through the outlet 18. The fluid coming from the passage 4 thus passes through the second chamber 14 and enters the outlet pipe 28, from where it leaves the valve.

The direction of circulation of the fluid disclosed in the example illustrated promotes the self-cleaning of the valve. However, circulation in the opposite direction is also possible without departing from the scope of the invention.

Here, said pipe 28 continues axially from said liner 6. The diameter of the pipe 28 is advantageously equal to the diameter of the liner 6. As a variant, not illustrated, the longitudinal axis of the liner 6 can form an angle of between 130° and 180° with a longitudinal axis of the pipe 28.

Advantageously, said housing 1 is made in one piece. This promotes the sealing of the valve to the outside. It can in particular be a part made from a thermoplastic material, for example molded. Said body 2 and/or said pipe 28 can also be made from a thermoplastic material. They are fastened to said housing 1 by a bonded connection. This promotes sealing to the outside. It can be, for example, a friction weld, a laser weld or an adhesive bond.

The valve further comprises a control member 30 for the opening/closing thereof. Said control member 30 is able to move relative to said body 2 in order to selectively open or close said passage 4. To this end, said control member is capable of sliding along said body 2 at least in line with said passage 4. Providing the passage 4 in said body 2 and sliding the control member 30 along said body 2 allows the control member 30 to leave the passage 4 open or to close it without having to abut against another part, while offering sufficient sealing, at least in applications in which the difference in the upstream and downstream pressure in the circuit provided therewith is limited.

That being said, in order to improve such sealing, said valve can comprise one or more sealing rings between said body 2 and said control member 30, as will be described in greater detail hereinafter.

Said control member 30 is preferably situated between the housing 1 and said body 2. In other words, said control member 30 is situated in said second chamber 14. Said control member is thus able to move inside said second chamber 14.

Said control member is for example formed by a sleeve 32, sliding on said liner 6. Said sleeve 32 is cylindrical. The sleeve 32 surrounds the liner 6. Said sleeve 32 and said liner 6 are preferably coaxial with play calibrated to allow the sleeve 32 to slide along the liner 6 while ensuring the desired sealing, in the closed position of the valve, that is, when the sleeve 32 covers the orifices 8 for the passage of the fluid formed in the liner 6.

There is also advantageously play between the control member 30, in particular the sleeve 32, and the housing 1.

It allows the fluid to pass on each axial side of the sleeve 32, limiting piston effects. This results in the balancing of pressure over the entire outer surface of the sleeve 32. The force to be supplied to move the control member 30 is therefore limited. Alternatively or additionally, channels for the passage of fluid can be provided axially on either side of the control member, in particular by deforming the surface of the housing 1, for example by giving it a corrugated appearance, said channels extending along said longitudinal axis X while being spaced apart from each other angularly about said longitudinal axis X.

It will be noted that having orifices 8 for the passage of fluid with the same cross-section and situated angularly evenly about the longitudinal axis also contributes to balancing the pressure applied to the control member 30.

Said control member 30, in particular said sleeve 32, can advantageously be actuated electromagnetically. Such a feature makes it possible to control it remotely. It therefore promotes the sealing of the housing 1 to the outside. To this end, said control member 30 is formed by or at the very least includes a magnetic material.

Said valve preferably comprises an excitation winding 34 for actuating said control member 30. This is for example an electrical coil, through which an electrical current passes or does not pass. When a current passes through said excitation winding 34, it creates a magnetic field that moves said control member 30 along the direction of the longitudinal axis X. In the example illustrated, the excitation winding 34 surrounds the outside of said housing 1. They are coaxial.

Said valve further comprises a return spring 36 making it possible to return said control member 30 to the rest position. Said sleeve 32 and said return spring 36 continue axially from each other. Here, the return spring 36 is a helical spring. It rests on the sleeve 32 and on a longitudinal end of said housing 1.

In the example illustrated in FIGS. 1 and 2, said rest position of the return spring 36 is an open position of the passage 4. More specifically, as illustrated in FIG. 1, when the excitation winding 34 is not powered, the return spring 36 is at rest and the passage 4 is open. Conversely, as illustrated in FIG. 2, when the excitation winding 34 is supplied with power, the passage 4 is closed and the return spring 36 is compressed.

Said valve further comprises a spring 38 for stabilizing the control member 30. It is used to prevent the control member from moving when the excitation winding 36 is not supplied with power and the return spring 36 is in the rest position. Said sleeve 32 and said stabilizing spring 38 continue axially from each other. Here, said stabilizing spring 38 is a helical spring. It rests on the sleeve 32 and on a longitudinal end of said housing 1, opposite the end on which the return spring 36 rests.

Said return spring 36 and said stabilizing spring 38 are situated on either side of the control member 30. Preferably, when one is working in extension, the other is working in compression, and vice versa. Here, the return spring 36 is around a portion of the liner 6 comprising the passage 4 and around the outlet pipe 28.

The arrangement of the control member 30, the return spring 36 and the stabilizing spring 38 makes it possible to control the position of the control member 30 in a stable manner in a position between a closed position of the fluid passage and a fully open position of the fluid passage. Controlling the electrical current flowing in the coil makes it possible to control the electromagnetic force applied to the control element 30. The balanced position of the control member 30 results from the balance between the magnetic force, the forces exerted by the return spring 36 and the stabilizing spring 38, and the mechanical and fluid frictional forces. Appropriate control of the electrical current passing through the control coil thus makes it possible to obtain full closure, full opening or partial opening of the valve.

The control member 30 is moved without mechanical impacts, as the control member 30 does not rest against a seat or stop at any time. The return spring 36 is interposed between one axial end of the sleeve 32 and one end of the housing 1, while the stabilizing spring 38 is arranged between the other axial end of the sleeve 32 and the other end of the housing 1. The valve thus operates particularly quietly. The absence of mechanical impacts on the control member 30 also improves the reliability of the valve. In addition, by adjusting the respective stiffness and preload of the stabilizing spring and the return spring, it is possible to adjust the magnetic force necessary to move the control member. It is thus possible to obtain a valve in which the stiffness of the assembly formed by the two springs in opposition is low, while using springs with standard features. It is thus possible to use a magnetic actuator that only generates a weak force. The cost of the valve can thus be limited.

Figure 3:
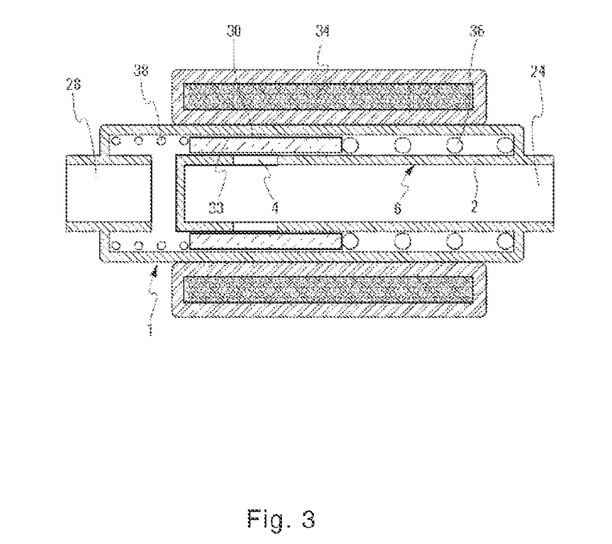
Figure 4:
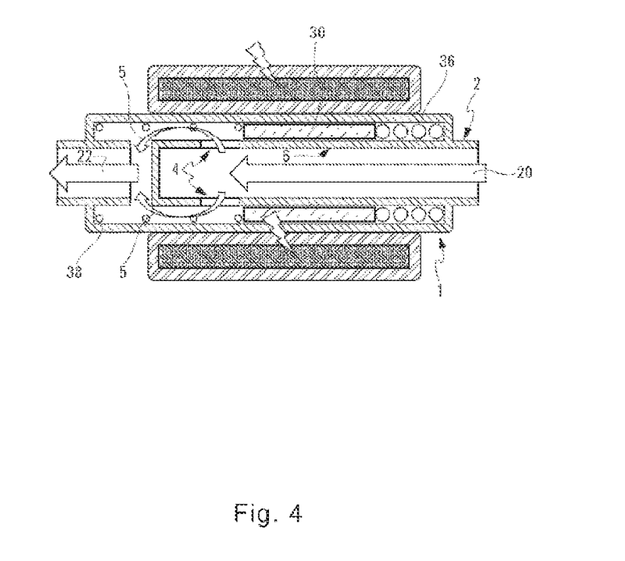
FIG. 4 shows the valve in FIG. 3, this time in an open configuration, FIG. 5 schematically illustrates, in longitudinal section, a third exemplary embodiment of a valve according to the invention, in an open configuration.

As illustrated in FIGS. 3 and 4, as a variant, said rest position of the return spring 36 is a closed position of the passage 4. More specifically, as illustrated in FIG. 3, when the excitation winding 34 is not powered, the return spring 36 is at rest and the passage 4 is closed. Conversely, as illustrated in FIG. 4, when the excitation winding 34 is supplied with current, the passage 4 is open and the return spring 36 is compressed. Said return spring 36 is situated around the liner 6, in the portion thereof that does not comprise the passage 4. In all other ways, the valve of this embodiment is preferably identical to the valve of the embodiment in FIGS. 1 and 2. In particular, said return spring 36 is compressed when the passage orifice 4 is open.

Figure 5:
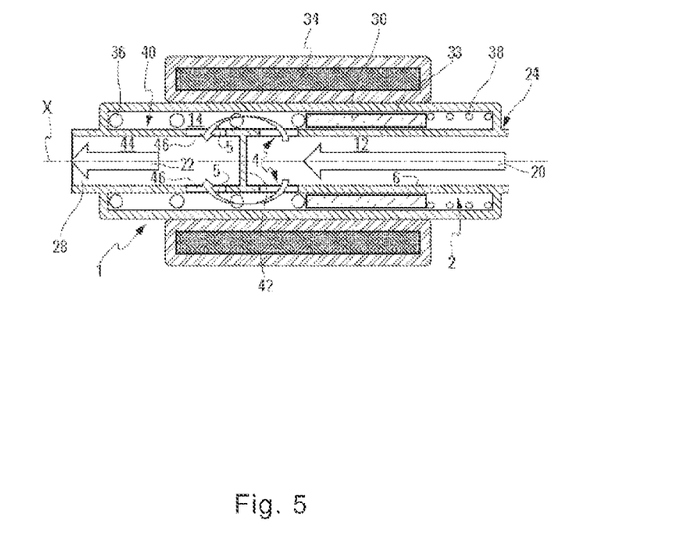
Figure 6:
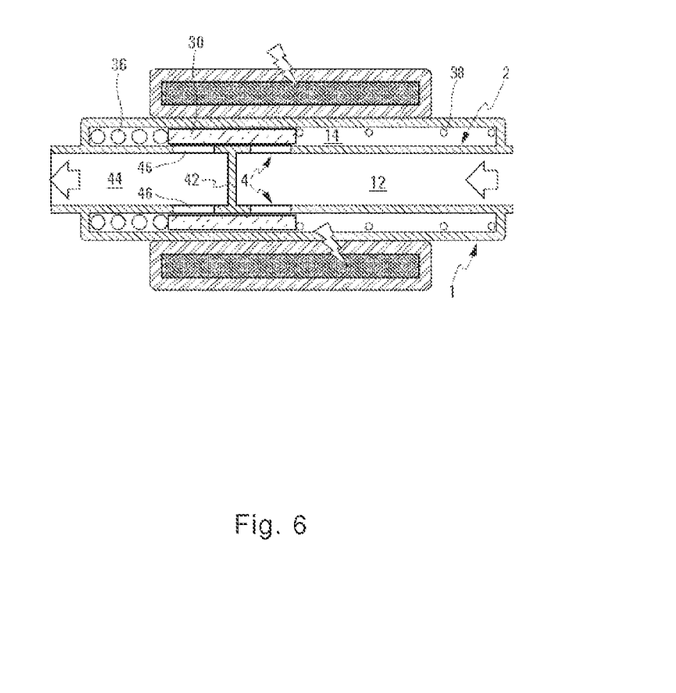

As illustrated in FIGS. 5 and 6, as a variant, said valve comprises a one-piece assembly defining said liner 6 and said pipe 28. In all other ways, the valve of this embodiment is preferably identical to the valve of the embodiment in FIGS. 1 and 2, that is, with a passage 4 closed when the excitation winding is powered. As a variant, it can also be identical, in all other ways, to the valve of the embodiment in FIGS. 3 and 4.

Said one-piece assembly is formed, for example, by a tube 40, in particular oriented along the longitudinal axis X of the housing 1. Said tube 40 comprises an internal partition 42, making it possible to separate an internal volume of the liner 6, corresponding to the first chamber 12, and an internal volume of the pipe 28, forming a third chamber 44, in communication with said second chamber 14. The latter then extends toroidally between the tube 40 and the housing 1.

In order to allow the fluid to circulate from said second chamber 14 to said third chamber 44, said tube comprises, at said pipe 28, one or more fluid circulation orifices 46 that emerge radially.

Figure 7:
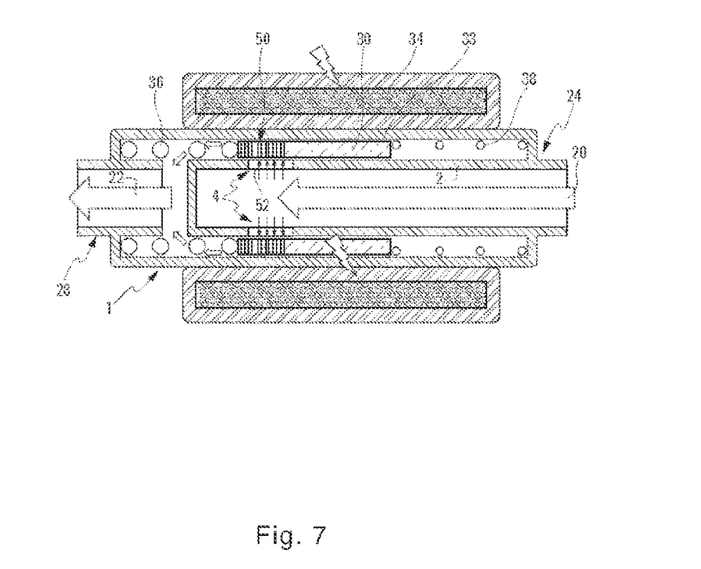
Figure 8:
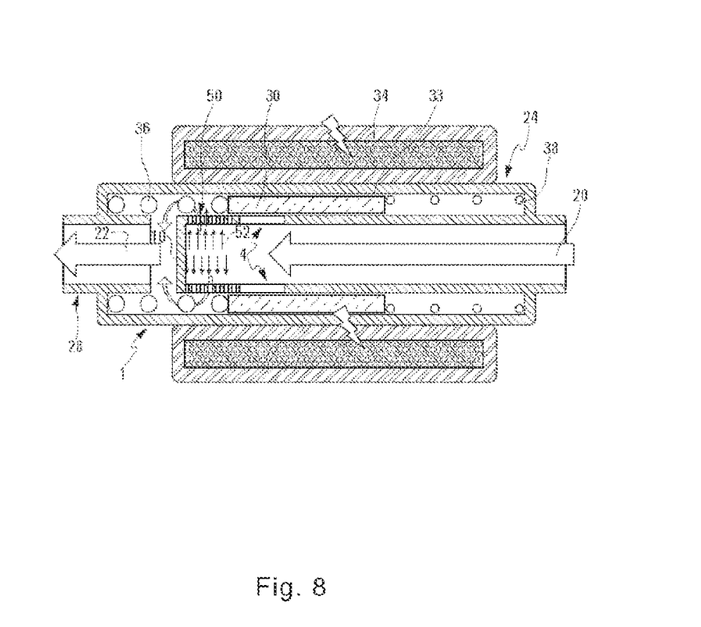

In the embodiment illustrated in FIGS. 7 and 8, said control member 30 and/or said body 2 is/are provided with a plurality of openings 50 for the circulation of the fluid allowing the progressive opening of the passage when said control member 30 moves. The fluid passes through said openings along the arrows labeled 52. Said passage openings 50 are advantageously calibrated to allow the expansion of the fluid. The flow cross-section of the fluid increases progressively as more and more openings 50 are uncovered and allow the fluid to pass through. This progressive expansion makes it possible, for example, to balance the refrigerant flow rates passing in parallel through the multiple channels of a heat exchanger or passing through different heat exchangers. The temperature can thus be controlled more evenly.

Another possible application of this principle is the creation of adjustable expansion as a function of the electromagnetic force applied. This electromagnetic force is substantially proportional to the electrical current passing through the excitation coil 34. By controlling the control current of the valve, it is possible to keep the control member 30 in any intermediate position between the closed position of the fluid passage 4 and the fully open position of the passage 4. In other words, the control member 30 is configured to be kept in a stable manner in an intermediate position between a fully open position and a closed position. The number of passage openings 50 that are free and allow the fluid to pass through the valve can thus be modulated.

It is thus possible to obtain different degrees of expansion of the refrigerant. This makes it possible to modulate the cooling power generated by the heat exchanger(s) supplied by the valve.

In FIG. 7, said openings 50 are situated on the control member 30. They are suitable for being positioned facing the passage 4 in an intermediate location of the control member 30. Said intermediate location of the control member 30 is situated between its open location of the passage 4 and its closed location of the passage 4. In all other ways, the valve of this embodiment is identical to the valve of the embodiment in FIGS. 1 and 2.

Here, in the rest position, the excitation winding 34 is not powered and the control member is in its location in which the passage 4 is open. When the excitation winding 34 is powered, the control member 30 leaves the previous in location and moves axially so that the openings 50 pass in front of the passage 4 and the control member 30 continues its stroke until the passage 4 is closed, the openings 50 then no longer being in front of the passage 4. The reverse movement is taken on the opening of the passage 6 once the excitation member 34 is no longer powered. It is possible to immobilize the openings 50 in front of the passage 4, for example by modulating the supply current in the excitation winding 34. This modulation of the supply current then makes it possible to progressively reduce the number of openings 50 that are facing the passage 4. This results in a progressive reduction in the fluid flow cross-section. In this configuration shown in FIG. 7, in addition to the opening/closing function, a function of variable expansion of the fluid is obtained by controlling the electrical current passing through the excitation winding of the coil.

In FIG. 8, said openings 50 are on the body 2. They are more specifically located, axially, between its blind end 10 and the passage 6.

Similarly to the configuration shown in FIG. 7, the modulation of the supply current makes it possible to move the control member 30 towards the closed position of the fluid passage 4, on the left in FIG. 8. The openings 50 are thus progressively closed. A progressive reduction in the fluid flow cross-section is thus obtained. This configuration thus makes it possible to obtain, in addition to the fluid passage opening/closing function, a variable expansion function, by controlling the electrical current passing through the winding of the control coil.

As already stated, said valve can comprise one or more sealing rings, not illustrated, between said body 2 and said control member 30. They are situated, for example, on either side of the passage 4. They can be positioned in grooves made in the liner 6, on an outer wall thereof. They extend radially so that they come into contact with an inner wall of the sleeve 32.

Figure 9:
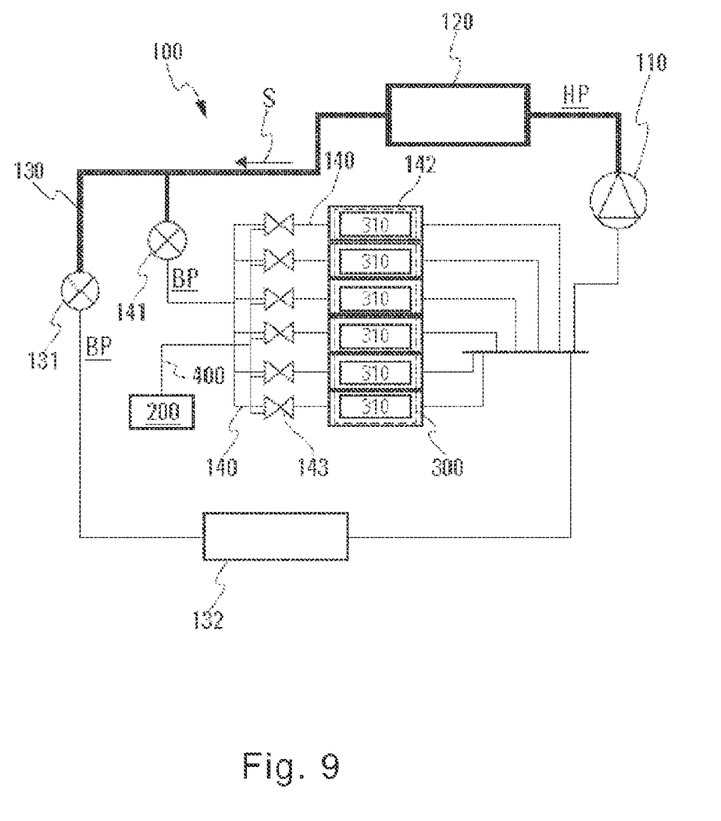

As illustrated in FIG. 9, the invention also relates to a thermal treatment system 100 for a vehicle, in particular for a motor vehicle, comprising valves 143 as described above.

Said system comprises, for example, a compression device 110, a first heat exchanger 120 suitable for being passed through by a flow of air external to a passenger compartment of the vehicle, a first expansion member 141 and a plurality of second heat exchangers 142, here suitable for cooling battery modules 310 of an electrical energy storage device 300. Each of said second heat exchangers 142 is arranged on a respective first branch 140 of the system so that the refrigerant passes through it, in parallel with and independently of the others. Each of said first branches comprises one of the valves 143. The refrigerant thus circulates, or does not circulate, in said second exchangers 142 as a function of the open or closed state of the corresponding valve 143. A control module 200 makes it possible to control the operation of all of the valves 143. To this end, the control module 200 is electrically connected to each of the valves 143 by electrical cables 400. The control module 200 includes as many control outputs as there are valves 143. The control module 200 can thus control each valve 143 independently of each other. It is thus possible to control the flow rate passing through each valve independently. Each valve can be completely closed, completely open or open to an intermediate setpoint value.

Advantageously, the control module 200 also controls the operation of the expansion members 131 and 141.

Said system can comprise, in parallel with the first expansion valve 141 and the first branches 140, a second branch comprising a second expansion valve 131 and a third heat exchanger 132, capable of cooling a flow of air intended to enter the passenger compartment of the vehicle.

Of course, the valve according to the invention can be used in any other type of application.

The invention claimed is:

1. A fluid circulation valve, comprising:
   a housing;
   a body for circulation of a fluid, the body being situated at least partially in the housing and being fastened to the housing;
   a passage for the fluid between the body and the housing;
   a control member that is configured to be actuated electromagnetically, the control member being able to move relative to the body to selectively open or close the passage;
   a return spring configured to return the control member to a rest position, the return spring being disposed between a first end of the control member and a first end of the housing; and
   a stabilizing spring for stabilizing the control member, the stabilizing spring being disposed between a second end of the control member and a second end of the housing;
   wherein the body includes, at least locally, a tubular configuration in line with the passage, the control member being capable of sliding along the body at least in line with the passage.

2. The valve as claimed in claim 1, wherein the control member is situated between the housing and the body.

3. The valve as claimed in claim 1, wherein the housing is made in one piece.

4. The valve as claimed in claim 1, wherein the passage is situated on a side wall of the body.

5. The valve as claimed in claim 1, wherein the control member comprises a sleeve and the body comprises a liner, provided with the passage, the sleeve and the liner being coaxial.

6. The valve as claimed in claim 5, wherein the liner comprises a blind end, the blind end being a closed, longitudinal end of the liner situated in the housing.

7. The valve as claimed in claim 5, further comprising:
   an outlet pipe for the fluid, inserted into the housing; and
   a one-piece assembly defining the liner and the pipe, the one-piece assembly being formed by a tube;
   wherein the tube comprises an internal partition separating an internal volume of the liner and an internal volume of the pipe; and
   wherein the pipe comprises one or more orifices for circulation of the fluid emerging into the housing.

8. The valve as claimed in claim 1, wherein the control member or the body is provided with a plurality of openings for circulation of the fluid allowing the passage to open progressively when the control member moves, the plurality of openings being calibrated to allow an expansion of the fluid.

9. A thermal treatment system for a motor vehicle, comprising:
   at least one valve having:
       a housing and a body for circulation of a fluid, the body being situated at least partially in the housing and being fastened to the housing;
       a passage for the fluid between the body and the housing;
       a control member that is configured to be actuated electromagnetically, the control member being able to move relative to the body to selectively open or close the passage;
       a return spring configured to return the control member to a rest position, the return spring being disposed between a first end of the control member and a first end of the housing; and
       a stabilizing spring for stabilizing the control member, the stabilizing spring being disposed between a second end of the control member and a second end of the housing;
       wherein the body includes, at least locally, a tubular configuration in line with the passage, the control member being capable of sliding along the body at least in line with the passage.

* * * * *